(12) United States Patent
Kilgard et al.

(10) Patent No.: US 7,426,724 B2
(45) Date of Patent: Sep. 16, 2008

(54) OPTIMIZED CHAINING OF VERTEX AND FRAGMENT PROGRAMS

(75) Inventors: Mark J. Kilgard, Austin, TX (US); Christopher T. Dodd, Woodside, CA (US); Rev Lebaredian, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 736 days.

(21) Appl. No.: 10/883,893

(22) Filed: Jul. 2, 2004

(65) Prior Publication Data

US 2006/0005178 A1    Jan. 5, 2006

(51) Int. Cl.
*G06F 9/45* (2006.01)
(52) U.S. Cl. ....................................................... 717/151
(58) Field of Classification Search ................. 717/159, 717/151
See application file for complete search history.

(56) References Cited

U.S. PATENT DOCUMENTS

| | | | | |
|---|---|---|---|---|
| 5,005,137 A | * | 4/1991 | Ernst ........................... | 709/246 |
| 5,812,854 A | * | 9/1998 | Steinmetz et al. ........... | 717/159 |
| 5,870,097 A | | 2/1999 | Snyder et al. | |
| 5,977,977 A | | 11/1999 | Kajiya et al. | |
| 6,044,225 A | * | 3/2000 | Spencer et al. ................ | 710/52 |
| 6,891,544 B2 | * | 5/2005 | Oka et al. .................... | 345/545 |
| 6,983,456 B2 | * | 1/2006 | Poznanovic et al. ......... | 717/133 |
| 2004/0158693 A1 | | 8/2004 | Dagan et al. | |
| 2005/0243094 A1 | | 11/2005 | Patel et al. | |

OTHER PUBLICATIONS

Ahn et al., Evaluating the Imaging Stream Architecture, Mar. 2004, IEEE, p. 1-12.*

* cited by examiner

*Primary Examiner*—John Chavis
(74) *Attorney, Agent, or Firm*—Townsend and Townsend and Crew LLP

(57) ABSTRACT

A system optimizes two or more stream processing programs based upon the data exchanged between the stream processing programs. The system alternately processes each stream processing program to identify and remove dead program code, thereby improving execution performance. Dead program code is identified by propagating constants received as inputs from other stream processing programs and by analyzing a first stream processing program and determining the outputs of a second stream processing program that are unused by the first stream processing program. The system may perform multiple iterations of this optimization is previous iterations introduce additional constants used as inputs to a stream processing program. Following optimization of the stream processing programs, the optimized stream processing programs are compiled to a format adapted to be executed by a stream processing system.

25 Claims, 10 Drawing Sheets

OPTIMIZED CHAINING OF VERTEX AND FRAGMENT PROGRAMS

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Many graphics processing subsystems are highly programmable, enabling implementation of, among other things, complicated lighting and shading algorithms. In order to exploit this programmability, applications can include one or more graphics processing subsystem programs, which are executed by the graphics processing subsystem in parallel with a main program executed by the CPU. Although not confined to merely implementing shading and lighting algorithms, these graphics processing subsystem programs are often referred to as shading programs or shaders.

Graphics processing subsystems typically use a stream-processing model, in which input elements are read and operated on by successively by a chain of stream processing units. The output of one stream processing unit is the input to the next stream processing unit in the chain. Typically, data flows only one way, "downstream," through the chain of stream processing units. Examples of stream processing units include vertex processors, which process two- or three-dimensional vertices, rasterizer processors, which process geometric primitives defined by sets of two- or three-dimensional vertices into sets of pixels or sub-pixels, referred to as fragments, and fragment processors, which process fragments. Additional types of stream processing units can be included in a chain. For example, a tessellation processor can receive descriptions of higher order surfaces and produce sets of geometric primitives defined by vertices and approximating or corresponding to the higher order surfaces.

Some or all of the stream processing units in a chain may be programmable, with each programmable stream processing unit having its own separate shading program operating in parallel with shading programs executing on other stream processing units. Implementations of complicated algorithms often depend on separate shading programs tailored to each stream processing unit working together to achieve the desired result. In these implementations, outputs of shading programs for initial stream processing units in a chain may be linked with the inputs of shading programs for subsequent stream processing units in the chain. Shading programs can be written in a variety of low-level and high-level programming languages, including low-level assembly, the Cg language, the OpenGL shading language, and the DirectX High Level shading language.

It is desirable to optimize shading programs to improve rendering performance and to allow applications to fully exploit the capabilities of the graphics processing subsystem. When shading programs for different stream processing units are chained together, (which may be referred to as linking in some graphics API nomenclatures,) there may be opportunities for optimization based upon the combination of the two or more shading programs, referred to as inter-shader optimizations.

For example, a first shading program may output a value that is unused as an input by a second chained shading program in the graphics processing stream. In this example, the portions of the first shading program used to compute the unused output may be safely omitted, thereby decreasing the execution time of the first shading program. In another example, if the output of a first shading program is constant, then the value of the constant can be propagated to the input of a second shading program chained to the first shading program, decreasing the execution time of the first shading program and potentially allowing for additional optimizations within the second shading program.

Additionally, application developers prefer to write large, all-purpose shading programs for each stream processing unit. Each all purpose shading program allows an application to select one or more operations from a set to be executed as needed by the stream processing unit. An application can implement a specific algorithm across several stream processing units by selecting the appropriate operations from each stream processing unit's shading program. Using large, all-purpose shading program with selectable operations for each stream processing unit, rather than a number of different small shading programs each implementing a single operation, greatly simplifies application development. Unfortunately, executing large, all-purpose shading programs is slow due to a number of factors, including the time and bandwidth needed to transfer large shading programs to the graphics processing subsystem, even when only a small portion of the shading program is going to be executed. Optimizing the chaining of shading programs can also simplify such large programs to the point that they fit within hardware resource limits that the original programs might not satisfy if not optimized.

Prior automatic optimization techniques only consider each shading program in isolation. Existing optimization techniques for hardware shading compilers do not analyze the relationships between chained shading programs assigned to different stream processing units to determine inter-shader optimizations. Additionally, these prior optimization do not take into account the one way data flow in a chain of stream processing units and therefore miss many other potential optimizations.

It is therefore desirable to optimize two or more shading programs chained together based upon the relationships between the chained shading programs. It is further desirable to optimize large, all-purpose shading programs to execute efficiently and without transferring large amounts of data to the graphics processing subsystem unnecessarily. It is still further desirable to be able to perform inter-shader optimizations at runtime, allowing applications to dynamically select combinations of shading programs without compromising performance.

BRIEF SUMMARY OF THE INVENTION

An embodiment of the invention is a system for optimizing two or more stream processing programs based upon the data exchanged between the stream processing programs. The system alternately processes each stream processing program to identify and remove dead program code, thereby improving execution performance. Dead program code is identified by propagating constants received as inputs from other stream processing programs and by analyzing a first stream processing program and determining the outputs of a second stream processing program that are unused by the first stream processing program. The system may perform multiple iterations of this optimization as previous iterations introduce additional constants used as inputs to a stream processing program. Following optimization of the stream processing programs, the optimized stream processing programs are compiled to a format adapted to be executed by a stream processing system.

An embodiment of the invention is a method for optimizing stream processing programs adapted to be executed by a stream processing system. The stream processing system includes a first and a second programmable stream processing units. The second stream processing unit is connected with the first stream processing unit such that the output of the first stream processing unit is adapted to be the input of the second stream processing unit.

The method includes receiving a first stream processing program adapted to be executed by a first stream processing unit. The first stream processing program includes an output parameter. The method also receives a second stream processing program adapted to be executed by a second stream processing unit. The second stream processing program includes an input parameter corresponding to the output parameter of the first stream processing program. The first and second stream processing programs are optimized based upon the correspondence between the input parameter of the second stream processing program and the output parameter of the first stream processing program.

In an embodiment, optimizing the first and second stream processing programs includes eliminating from the first stream processing program dead program code adapted to compute an additional output parameter that is not used by the second stream processing program. In another embodiment, optimizing the first and second stream processing programs includes propagating a constant value for the input parameter of the second stream processing program in response to a determination that the output parameter of the first stream processing program is a constant and eliminating from the second stream processing program dead program code made redundant as a result of propagating a constant value.

In a further embodiment, optimizing the first and second stream processing programs includes propagating a uniform value for the input parameter of the second stream processing program in response to a determination that the output parameter of the first stream processing program is a uniform value and eliminating from the second stream processing program dead program code made redundant as a result of propagating a uniform value. A uniform value is a term of art in shading languages referring to a constant that while not allowed to change during the processing a stream of graphics primitives may change value between batches of such streamed data. For the most part, a uniform value can be treated like a constant value for optimization purposes such as constant folding (reducing an expression with constant terms to a simpler constant expression at compile time). However, if the compiler makes an optimization decision based on knowing the value of a uniform value (such as deciding the outcome of a branch), reoptimization is necessary if the new uniform value would change the earlier optimization decision.

An embodiment of the stream processing system resides within a graphics processing subsystem. In this embodiment, a programmable stream processing unit may be a programmable vertex processor, a programmable tessellation processor, or a programmable fragment processor.

BRIEF DESCRIPTION OF THE DRAWINGS

The invention will be described with reference to the drawings, in which.

In the drawings, the use of like reference numbers indicates identical components.

DETAILED DESCRIPTION OF THE INVENTION

Figure 1:
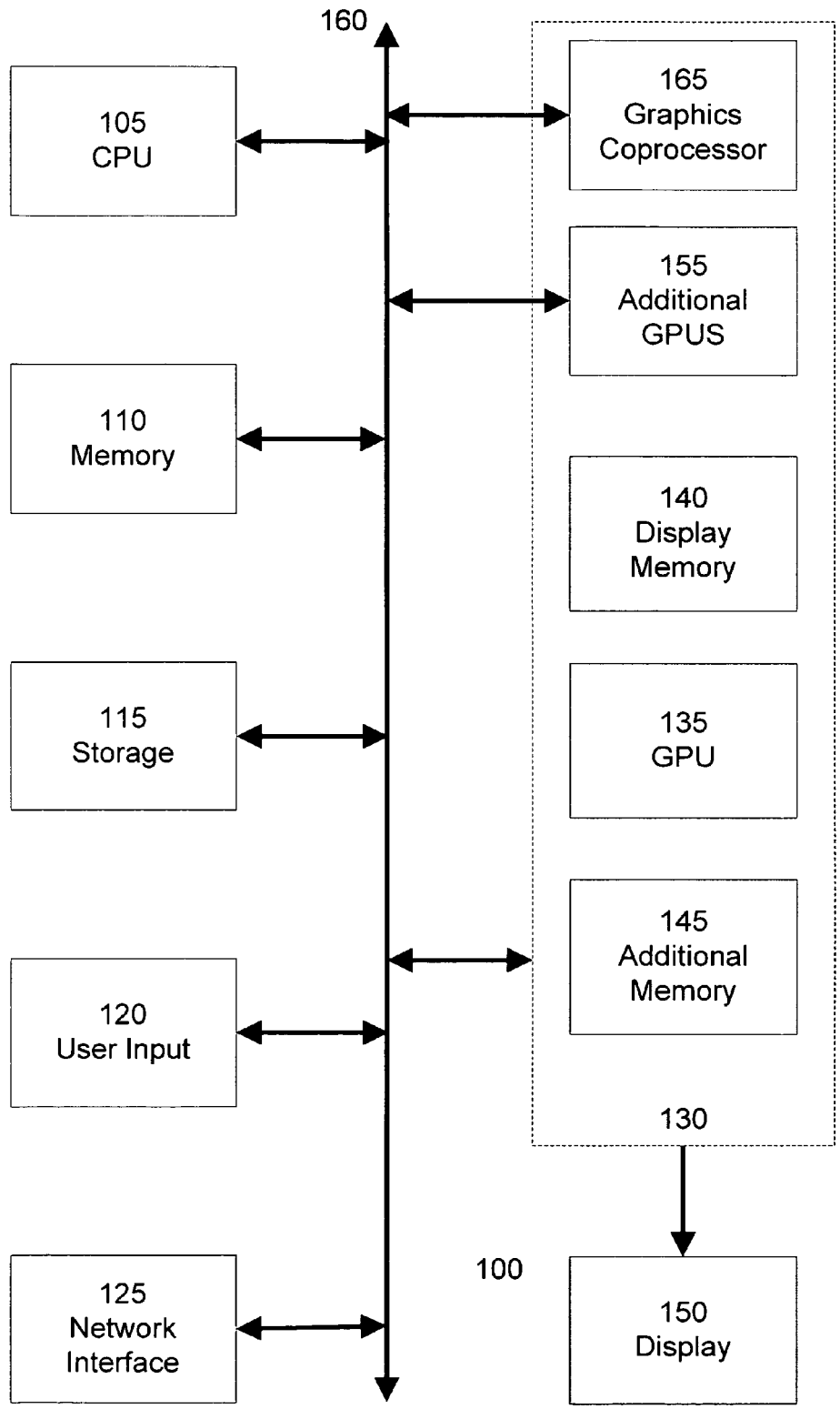
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X (also known as 3GIO), and HyperTransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 140 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same circuit board as GPU 135 and sharing a connection with GPU 135 to data bus 160, or can be located on additional circuit boards separately connected with data bus 160. Additional GPUs 155 can also be integrated into the same module or chip package as GPU 135. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip used to control the data bus 160.

Figure 2:
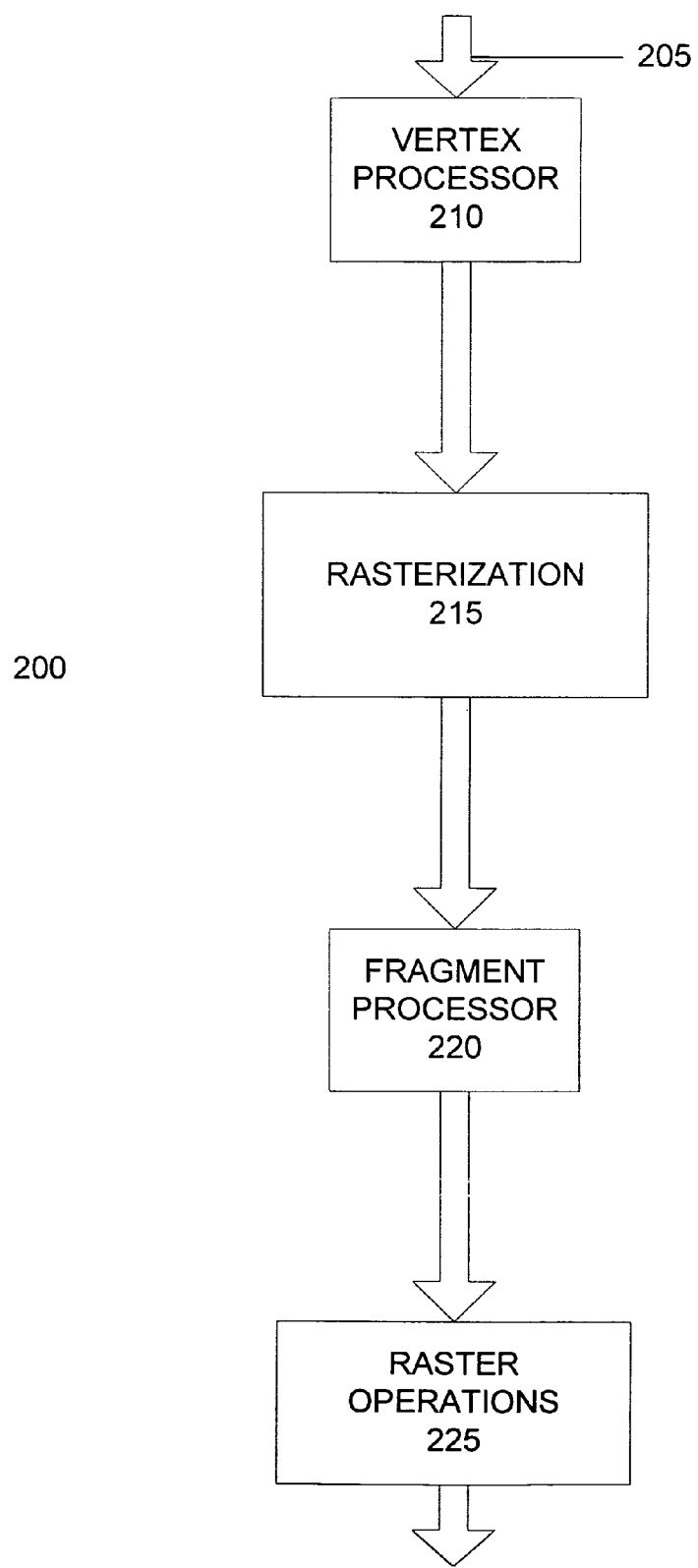
FIG. 2 illustrates an example chain of stream processing units of a graphics processing subsystem suitable for implementing an embodiment of the invention.

FIG. 2 illustrates an example chain of stream processing units 200 of a graphics processing subsystem suitable for implementing an embodiment of the invention. Chain of stream processing units 200 uses a stream-processing model, in which input elements are successively read and operated on by the chain of stream processing units 200. Each stream processing unit of the chain 200 can operate on the outputs of previous stream processing units in the chain. As discussed in detail below, some or all of the stream processing units may be programmable. Programmable stream processing units read an input element, execute a program using the input element, and output the result to the next stream processing unit in the chain. Each stream processing unit can have its own separate program operating independently or in conjunction with another stream processing unit program.

Input stream 205 includes rendering commands and data used to define the desired rendered image or images, including geometry, lighting, shading, texturing, motion, and/or camera parameters for a scene. The vertex processor 210 reads each rendering command and any associated data from the input stream 205. The rendering data may include one or more untransformed vertices. A vertex program, also referred to as a vertex shader, is executed by vertex processor 210 on each untransformed vertex to create a transformed vertex. The vertex processor 210 is programmable and rendering applications can specify the vertex program to be used for any given set of vertices. In a simple embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations.

The transformed vertices are passed from the vertex processor 210 to the rasterization stage 215. The rasterization stage 215 assembles one or more vertices into a geometric primitive, such as a point, line, triangle, or quadrilateral. The rasterization stage 215 then converts each geometric primitive into one or more pixel fragments. A pixel fragment provides the state to update a set of one or more pixels to be potentially displayed in the rendered image that are "covered" by the pixel fragment. Each pixel fragment has associated input parameters, for example screen position, texture coordinates, color values, and normal vectors.

The pixel fragments are then passed from the rasterization stage 215 to the fragment processor 220. The fragment processor 220 uses the information associated with each pixel fragment to determine the output color value of each pixel to be potentially displayed. Like the vertex processor 210, the fragment processor is programmable. A pixel fragment program, also referred to as a pixel shader, is executed on each pixel fragment to determine an output color value for a pixel. Although the pixel fragment operates independently of the vertex program, the pixel fragment program may be dependent upon information created by or passed through previous stream processing units, including information created by a vertex program. Rendering applications can specify the pixel fragment program to be used for any given set of pixel fragments. Pixel fragment programs can be used to implement a variety of visual effects, including lighting and shading effects, reflections, texture mapping and procedural texture generation. Additionally, both vertex and pixel fragment programs can be employed for non-visual purposes such as general purpose computation, image processing, and signal processing.

The set of pixels are then output to the raster operations and storage stage 225. The raster operations stage 225 integrates the set of pixels with the rendered image. Pixels can be blended or masked pixels with pixels previously written to the rendered image. Depth buffers, alpha buffers, and stencil buffers can also be used to determine the contribution of each incoming pixel, if any, to the rendered image. The combination of each incoming pixel and any previously stored pixel values is then output to the frame buffer as part of the rendered image.

Although not shown in the example of FIG. 2, additional types of stream processing units can be included in the chain of stream processing units 200. For example, a tessellation processor can receive descriptions of higher order surfaces and produce sets of geometric primitives defined by vertices and approximating or corresponding to the higher order surfaces. The sets of geometric primitives and their associated vertices can then be processed downstream by stream processing units such as vertex processors, rasterizers, and fragment processors, as discussed above.

Figure 3:
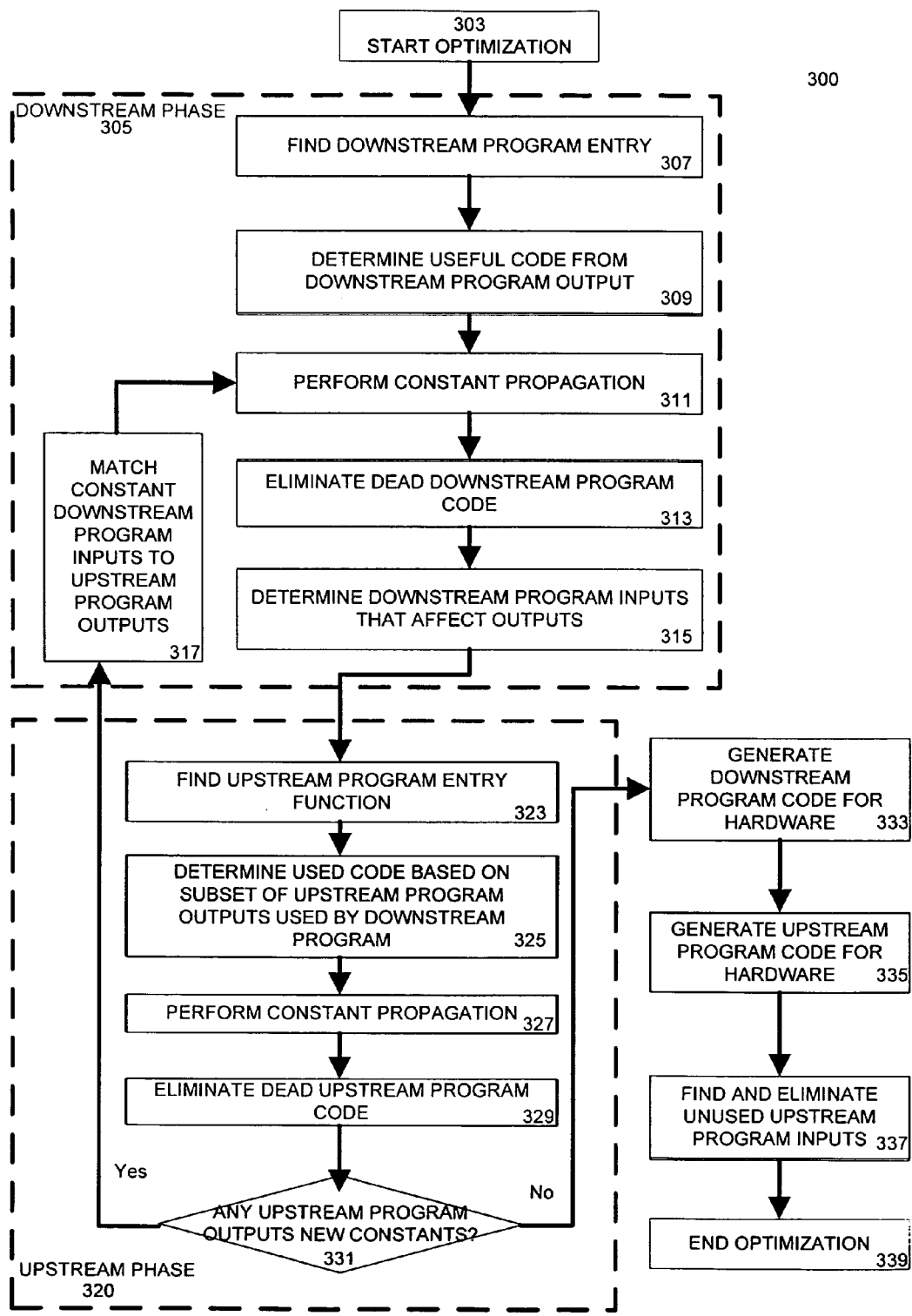
FIG. 3 illustrates a method for optimizing a pair of chained shading programs according to an embodiment of the invention.

FIG. 3 illustrates a method 300 for optimizing a pair of chained shading programs according to an embodiment of the invention. At step 303, optimization of two chained shading programs begins. In an embodiment, an application communicates the two shading programs to a runtime module, which compiles each shading program into an intermediate data format in order to be optimized. In a further embodiment, each shading program can be expressed in a different programming language, and the runtime module can employ a compiler suited to each shading program's language to produce a version of the shading program in the required intermediate data format. In an alternate embodiment, all or a portion of the runtime module is integrated with a device driver.

For the method 300, an application can explicitly specify that the two shading programs are chained or "linked", for example, by communicating with the runtime module via an API call. Alternatively, the runtime module can implicitly determine whether two shading programs are linked. For example, the runtime module can analyze the shading programs to be executed by the various stream processing units of the graphics processing subsystem to determine if any outputs of a first shading program are used as inputs to a second shading program.

Method 300 is divided into two phases, a downstream phase, 305, and an upstream phase 320. As discussed in detail below, method 300 iterates through the downstream phase 305 and the upstream phase 320 until all of inter-shader optimizations in both shading programs fully are found. Downstream phase 305 optimizes a shading program to be executed "downstream" in a chain of stream processing units from another, chained shading program. Conversely, the upstream phase 320 of method 300 optimizes a shading program to be executed "upstream" in a chain of stream processing units from a "downstream" shading program. For example, in the example chain of stream processing units 200 illustrated in FIG. 2, a fragment shading program executed by the fragment processor 220 would be considered "downstream" from a vertex program executed by vertex processor 210. In this example, if the vertex and fragment shading programs are chained, then the downstream phase 305 of method 300 would optimize the fragment shading program and the upstream phase 320 of method 300 would optimize the vertex shading program.

The downstream phase 305 of method 300 begins with step 307, in which the entry function of the downstream shading program. The entry function of the downstream shading program is where the stream processing unit begins execution of the downstream shading program. The input and output parameters of the entry function are also identified.

At step 309, method 300 determines useful code based upon the downstream shading program outputs. In an embodiment, step 309 uses data flow analysis to trace the program execution backwards from the outputs of the downstream shading program to the entry function of the downstream shading program. Portions of the downstream shading program involved in determining the downstream shading program outputs are designated as useful code. To ensure that optimization does not affect the output of the downstream shading program, the data flow analysis must be conservative in designating useful code. If two or more alternate branches of execution may be used to determine the downstream shading program outputs, then all of these branches of execution must be designated as useful code. Data flow dependency analysis must also correctly account for looping constructs and procedure calls.

At step 311, constant propagation is performed. Constant propagation identifies any program parameters that are constants and propagates the values of these program parameters through the downstream shading program to precompute additional program parameter values or pre-select branches of execution, if possible. For example, if a downstream shading program output is calculated from one or more program parameters, and step 311 determines that one or more of these program parameters has a constant value, then an intermediate or final value of the downstream shading program output can be precomputed (sometimes called a derived constant or uniform). In another example, if one or more program parameters is used to select a branch of execution of the downstream shading program, and step 311 determines that one or more of these program parameters has a known constant value, then the appropriate branch of execution may be pre-selected for execution.

Step 313 of method 300 identifies and eliminates dead code. Dead code is the portions of the downstream shading program that are not involved in determining the downstream shading program outputs, i.e. portions of the downstream shading program not designated as useful code in step 309. Dead code also includes portions of downstream shading program made redundant by the constant propagation of step 311. This includes, for example, portions of the downstream shading program used to calculate a program parameters that have been replaced with a precomputed constant in step 311. Additionally, dead code may include, for example, alternate branches of execution of the downstream shading program not pre-selected for execution in step 311. Step 313 then removes the dead code from the downstream shading program, thereby improving the performance and reducing the size of the downstream shading program.

From the remaining portion of the downstream shading program, step 315 determines the inputs of the downstream shading program affecting the outputs of the downstream shading program. This set of downstream program inputs is utilized later in step 325, discussed below.

Steps 333, 335, and 337 are logically independent so can be performed in an arbitrary order or in parallel.

At the conclusion of step 315 and an iteration of downstream phase 305, an iteration of upstream phase 320 begins to optimize an upstream shading program with step 323. Step 323 determines the entry function of the upstream shading program. The entry function of the upstream shading program is where the stream processing unit begins execution of the upstream shading program. The input and output parameters of the entry function are also identified.

Step 325 of method 300 determines useful code based upon a subset of upstream shading program outputs. The subset of upstream shading program outputs is all or a portion of the upstream shading program outputs corresponding to the set of downstream program inputs identified in step 315. In an embodiment, step 325 uses data flow analysis to trace the program execution backwards from the subset of upstream shading program outputs to the entry function of the upstream shading program. Portions of the upstream shading program involved in determining the subset upstream shading program outputs are designated as useful code. Portions of the upstream shading program unused in computing the subset of upstream shading program outputs, including the portions of the upstream shading program used in computing other upstream shading program outputs that are not part of the subset of upstream shading program outputs, are not designated as useful code. To ensure that optimization does not affect the output of the upstream shading program, the data flow analysis must be conservative in designating useful code. If two or more alternate branches of execution may be used to determine the subset of upstream shading program outputs, then all of these branches of execution must be designated as useful code. Data flow dependency analysis must also correctly account for looping constructs and procedure calls.

At step 327, constant propagation is performed. Constant propagation identifies any program parameters that are constants and propagates the values of these program parameters through the upstream shading program to precompute additional program parameter values or pre-select branches of execution, if possible. As an example, constant propagation of step 327 can precompute an intermediate or final value of an upstream shading program output if the upstream shading program output is calculated from one or more program parameters determined by step 327 to have a constant value. As another example, step 327 can preselect one of several alternate program branches for execution if step 327 determines that one or more program parameters used to select the appropriate branch of execution are constant.

Step 329 of method 300 identifies and eliminates dead code in the upstream program. Similar to that discussed above, dead code is the portions of the upstream shading program that are not involved in determining the subset of upstream shading program outputs. This includes the portions of the upstream shading program not designated as useful code in step 325. Dead code also includes portions of upstream shading program made redundant by the constant propagation of step 327, such as portions of the upstream shading program used to calculate a program parameters that have been replaced with a precomputed constant and alternate branches of execution of the upstream shading program not pre-selected for execution. Step 329 removes the dead code from the upstream shading program, thereby improving execution performance and reducing the size of the upstream shading program.

Step 331 determines whether further iterations of the downstream phase 305 and upstream phase 320 are needed to optimize the upstream and downstream shading programs. Step 331 determines whether any of the subset of outputs of the upstream shading program are constants that have not previously been analyzed by step 311 as constant-valued inputs of the downstream shading program. If any of the subset of outputs of the upstream shading program are constants not previously analyzed by step 311, then method 300 continues with the step 317.

Step 317 matches the constant-valued outputs of the subset of upstream program outputs identified in step 331 with the corresponding downstream shading program inputs. These downstream shading program inputs are then designated as constant-valued downstream shading program inputs. The downstream phase 305 of method 300 is then repeated, beginning with step 311. On the second and subsequent iterations of step 311, constant propagation is performed with the constant-valued downstream shading program inputs designated in step 317. Potentially, step 311 will result in additional portions of the downstream shading program becoming redundant, such as code for computing constant-valued downstream program outputs or intermediate values and for unused branches of execution. These additional redundant portions of the downstream shading program are then eliminated by step 315, thereby further improving execution performance and reducing program size of the downstream shading program.

Potentially, the elimination of dead code from the downstream shading program reduces the number of downstream shading program outputs, which in turn reduces the number of downstream shading program inputs used. A reduction in the number of downstream shading program inputs may make some of the corresponding upstream shading program outputs, and hence further portions of the upstream shading program itself, unnecessary, therefore allowing for further optimizations of the upstream shading program.

To this end, following an additional iteration of steps 311 and 313, step 315 determines the inputs of the downstream shading program affecting the outputs of the downstream shading program from the remaining portion of the downstream shading program. Following step 315, an additional iteration of the upstream phase 320 of method 300 is performed, with the set of downstream program inputs identified in step 315 utilized as the subset of upstream program outputs in step 325. The additional iteration of the upstream phase 320 of method 300 is performed to further optimize the upstream shading program. Steps 323, 325, 327 and 328 are repeated using the set of downstream program inputs identified in the most recent iteration of step 315. Potentially, this may result in the identification and elimination of additional redundant code of the upstream shading program. As a result, the execution performance of the upstream shading program is further improved, while the size of the upstream shading program is further reduced.

As discussed above, step 331 determines whether further iterations of the downstream phase 305 and upstream phase 320 are needed to optimize the upstream and downstream shading programs. If any of the subset of outputs of the upstream shading program are constants not previously analyzed by step 311, then method 300 continues with the step 317 and an additional iteration of the downstream phase 305 and the upstream phase 320. Otherwise, method 300 proceeds to step 333.

Step 333 converts the optimized downstream shading program from its intermediate data format into an executable format that is capable of being executed by a stream processing unit. In an embodiment, the executable format is in the form of assembly or machine language code tailored for the specific hardware architecture of the stream processing unit. Step 333 may also perform additional optimizations to the downstream shading program, for example loop unrolling. Unlike the optimizations discussed above, these additional optimizations are based upon the hardware architecture of the stream processing unit, rather than the relationship between the downstream and upstream shading programs.

Similarly, step 335 converts the optimized upstream shading program from its intermediate data format into an executable format that is capable of being executed by a stream processing unit. In an embodiment, the executable format is in the form of assembly or machine language code tailored for the specific hardware architecture of the stream processing unit. Step 335 may also perform additional optimizations to the downstream shading program, for example loop unrolling. Unlike the optimizations discussed above, these additional optimizations are based upon the hardware architecture of the stream processing unit, rather than the relationship between the downstream and upstream shading programs.

Step 337 determines the upstream shading program inputs affecting the outputs of the optimized upstream shading program. If there are upstream shading program inputs that are unused in determining the outputs of the optimized upstream shading program, then step 337 eliminates the code used to fetch these inputs from memory. This further optimization prevents wasting memory bandwidth to fetch input values that are unused. Step 339 then forwards the optimized upstream and downstream shading programs to their respective stream processing units for execution.

In a further embodiment, method 300 can be extended to optimize any arbitrary number of chained shading programs in sequence. This embodiment selects a pair of two chained shading programs from a set of chained shading programs to be optimized. For the selected pair of chained shading programs, this embodiment performs steps 303 through 331 as described above, potentially resulting in a simplified pair of programs. This embodiment then selects another pair of chained shading programs from the set of chained shading programs to be optimized and repeats steps 303 through 331 again for the newly selected pair of chained shading programs. Steps 303 through 331 are further repeated for all possible combinations of pairs of chained shading programs until no further optimizations are possible. At which point, the hardware code generation and input elimination in steps 333, 335, and 337 can be performed for all the shading programs in the sequence. It should be noted that the pairs of chained shading programs in this embodiment are not necessarily mutually exclusive. For example, a single upstream shading program can be chained with two or more downstream shading programs or the downstream shading program in a first pair of chained shading programs can be the upstream shading program in a second pair of chained shading programs.

In still another embodiment, method 300 can optimize chained shading programs for uniform values. A uniform value is a term of art in shading languages referring to a value that remains constant during the processing a given stream of data, but that may change value between batches of such streamed data. Optimizing uniform values can be performed in a similar manner as that for constant values discussed above. For example, steps 311, 317, 327, and 331 can be performed as described with uniform values in addition to constant values. However, if dead code is identified and eliminated as a result of uniform value propagation, then the chained shading program must be reoptimized when a change in the uniform value results in a different portion of the chained shading programs becoming dead code.

The operation of method 300 is illustrated in FIGS. 4-6, which show the effect of method 300 on example upstream and downstream shading programs. Tables 1 and 2 illustrate unoptimized source code for chained fragment and vertex shading programs written in the OpenGL Shading Language but could also be written in another language, respectively. The fragment shading program of Table 1 defines a number of program variables, including five uniform scalar variables, four varying scalar variables, and one varying vector variable. Similarly, the vertex shading program of Table 2 defines three uniform scalar variables and three varying scalar variables. In this example, both the fragment and vertex shading programs include varying variables "varying1," "varying2," and "varying3." When these two shading programs are chained together, the values of these common variables determined in the upstream vertex shading program are carried over when executing the downstream fragment shading program. Comments following the uniform variables in Tables 1 and 2 indicate the values of these uniforms assumed during optimization.

TABLE 1

Example Fragment Shading Program uniform float uniform1; // = 5.0
uniform float uniform2; // = 20.0
uniform float uniform3; // = 30.0
uniform float uniform4; // = 6.0

TABLE 1-continued

Example Fragment Shading Program

```
uniform float uniform5; // = 7.0
varying float varying1;
varying float varying2;
varying float varying3;
varying float varying4;
varying vec4 varying5;
void main( )
{
    float temp, temp2;
    if (uniform1 > 0.0) {
        if (varying1 < -9.1) {
            temp = varying2;
        } else {
            temp = uniform2 * uniform3 * varying3;
        }
        temp2 = temp + 0.5*uniform3;
    } else {
        temp2 = uniform4 * uniform5 * varying4;
    }
    gl_FragColor = temp2 * varying5;
}
```

TABLE 2

Example Vertex Shading Program

```
uniform float uniform6; // = 3.0
uniform float uniform7; // = 4.0
uniform float uniform8; // = 2.0
attribute float attrib1;
attribute float attrib2;
attribute vec4 attrib3;
varying float varying1;
varying float varying2;
varying float varying3;
varying float varying4;
varying vec4 varying5;
void main( )
{
    varying1 = uniform6 + uniform7;
    varying2 = uniform8;
    varying3 = attrib1;
    varying4 = uniform6 * attrib2;
    varying5 = attrib3;
    gl_Position = gl_ModelViewProjectionMatrix * gl_Vertex;
}
```

Figure 4A:
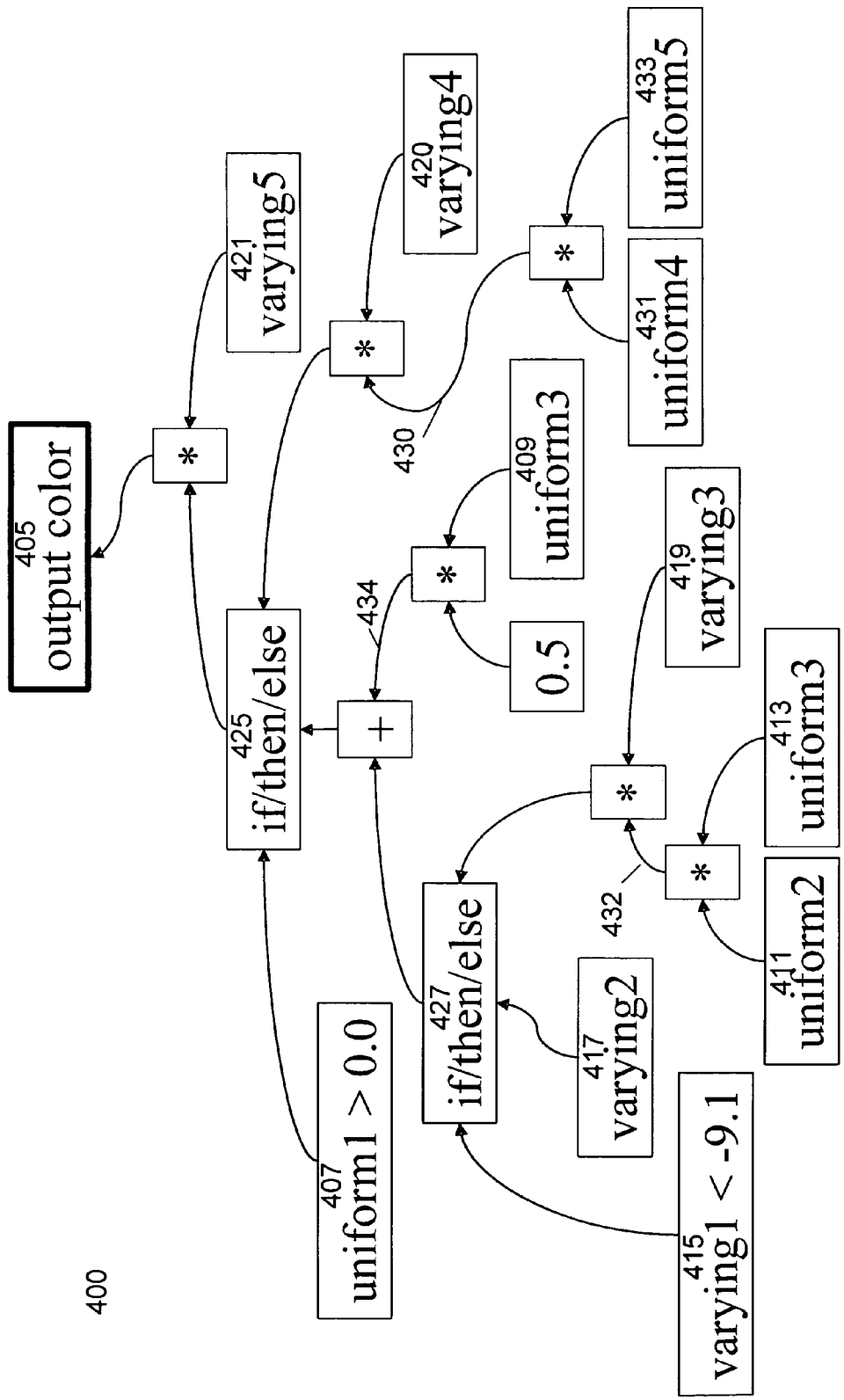
FIGS. 4A and 4B illustrate an example pair of chained shading programs in their unoptimized form.
Figure 4B:
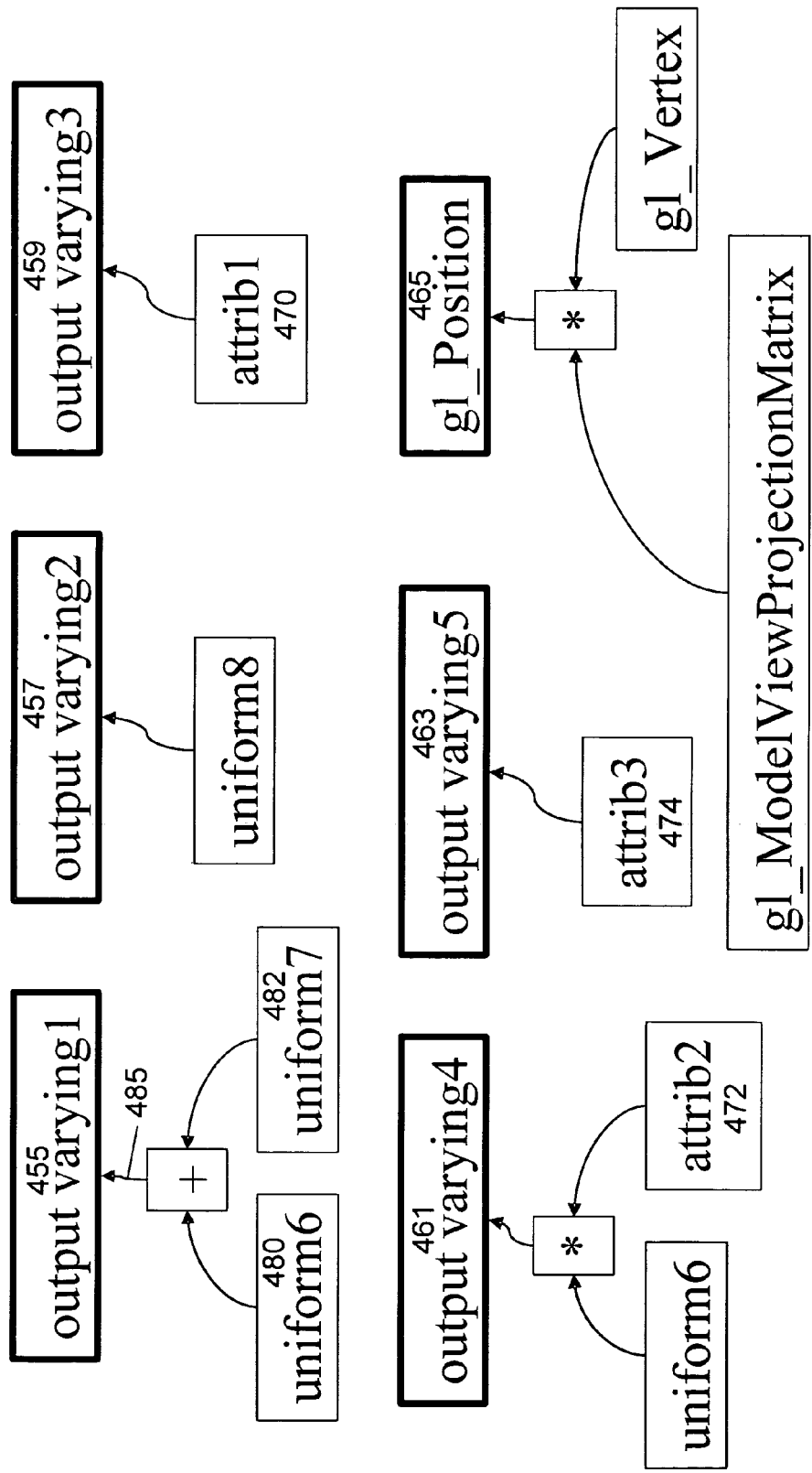

FIGS. 4A, 4B, 5A, 5B, 6A, and 6B use a data flow format to illustrate the optimization of an example pair of chained shading programs. The data flow format shows the association between shading program outputs and the input variables and operations used to compute these outputs. FIGS. 4A and 4B illustrate an example pair of chained shading programs of Tables 1 and 2 in their unoptimized form.

FIG. 4A illustrates a data flow diagram 400 of a portion of the example fragment shading program of Table 1. Data flow diagram 400 shows output variable 405 being formed from the combination of uniform variables 407, 409, 411, 413, 431, and 433 and varying variables 415, 417, 419, 420, and 421. Data flow diagram 400 also includes conditional branch statements 425 and 427 based on both uniform and varying variables, and expressions derived entirely from uniform variables, such as expressions 430, 432, and 434.

Similar to FIG. 4A, FIG. 4B illustrates a data flow diagram 450 of the example vertex shading program of Table 2. Data flow diagram 450 shows the output variables 455, 457, 459, 461, 463, and 465 of the example vertex shading program and their relationship with input variables. As discussed above, when the example shading programs of Tables 1 and 2 are chained together, the output variables "varying1," 455, "varying2," 457, and "varying3," 459, and "varying4," 461 correspond with the fragment shading program input variables "varying1," 415, "varying2," 417, and "varying3," 419, and "varying4," 420 omitted for clarity, in FIG. 4A. It should be noted that in this example, some of the output variables of the vertex shading program are unused by the chained fragment shading program, for example "varying5," 463; however, these output variables may be used by other downstream shading programs chained with the example vertex shading program. Additionally, data flow diagram 450 shows input attributes 470, 472, and 474. Unlike other variables, attributes are parameters associated with each data item, such as a vertex, processed by the shading program.

Figure 5A:
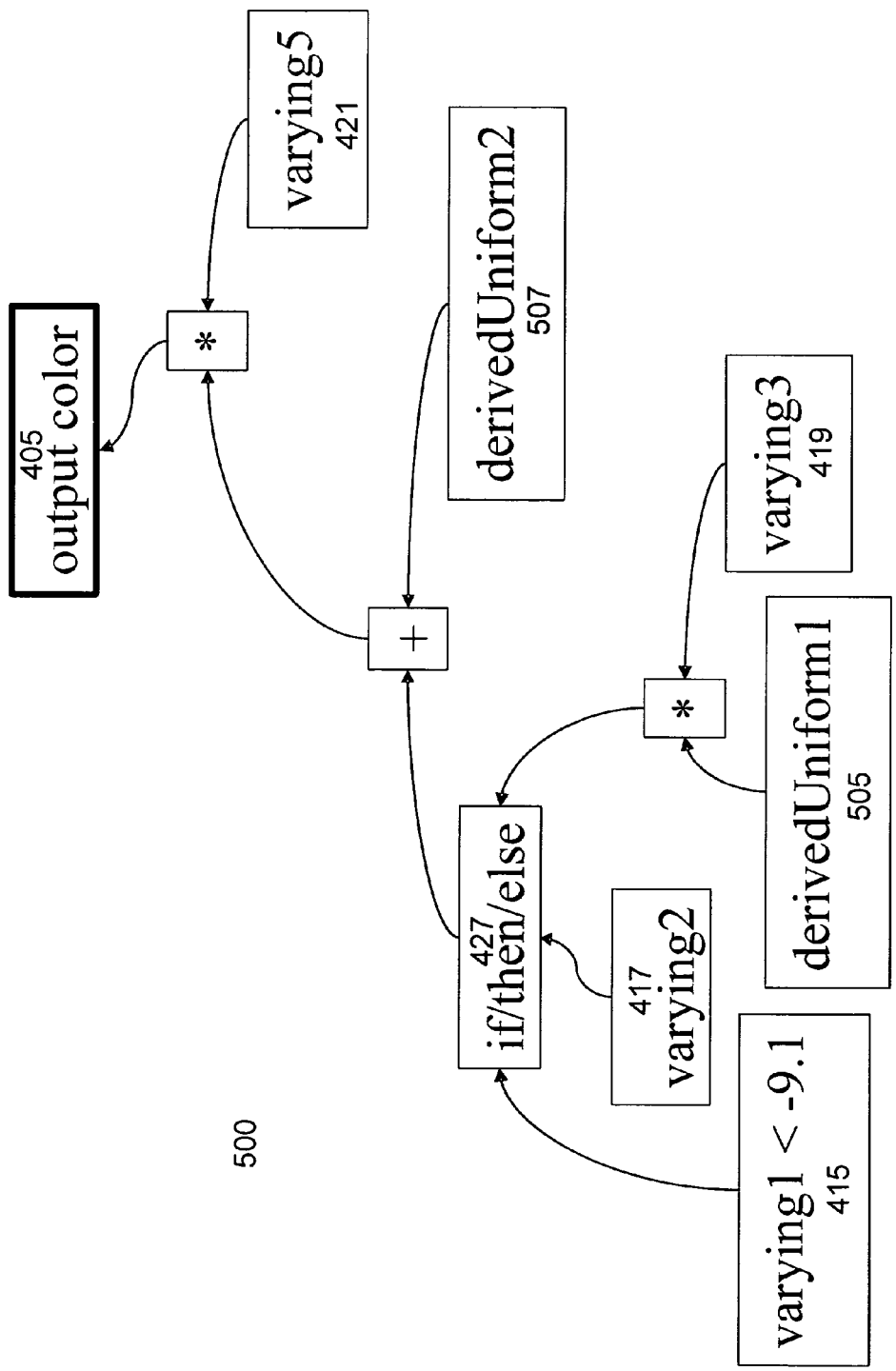
FIGS. 5A and 5B illustrate an example pair of chained shading programs after a first iteration of an optimization method according to an embodiment of the invention.
Figure 5B:
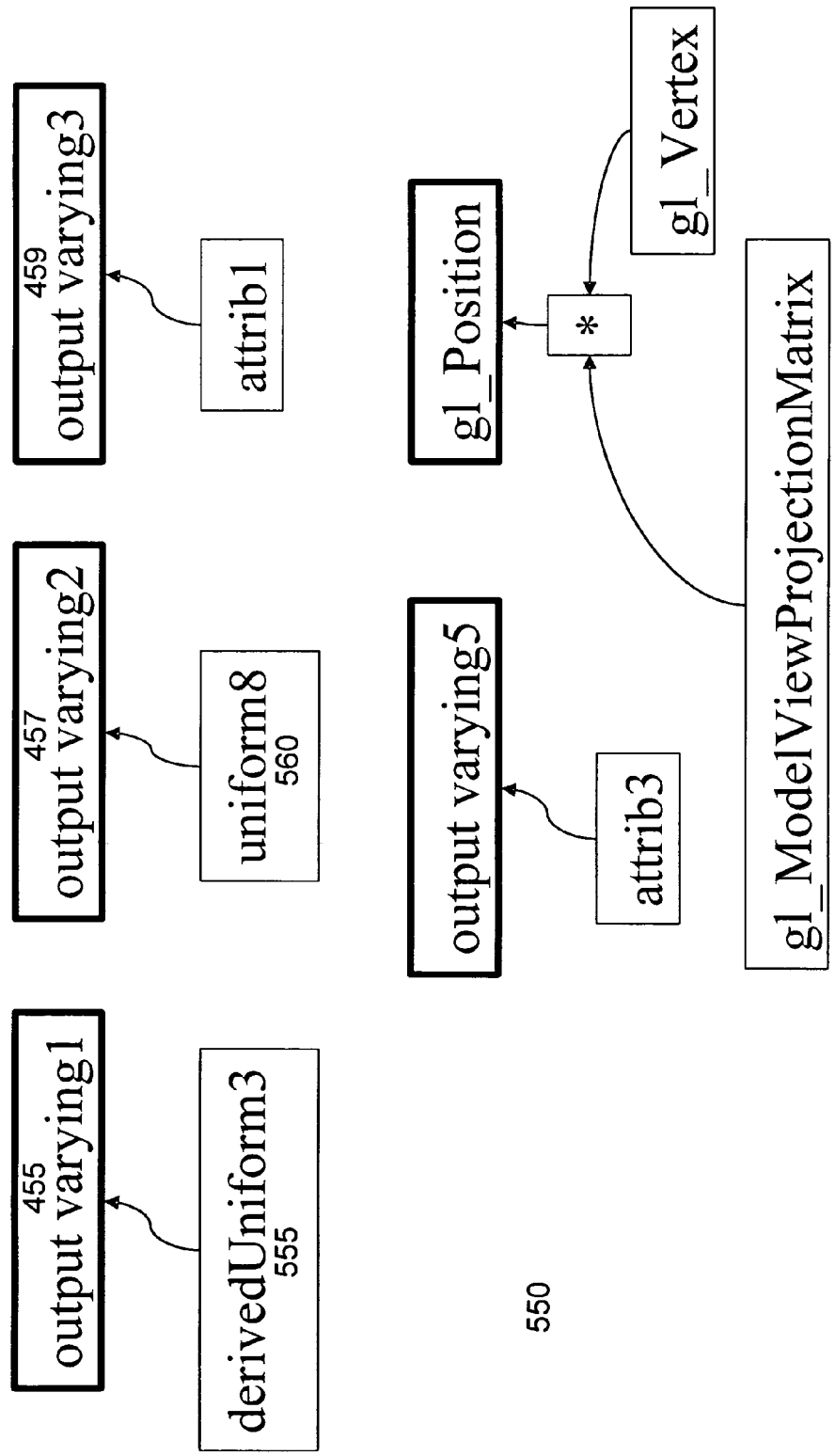

After processing the example chained shading programs through a first iteration of steps 305 through steps 331, the complexity of the example shading programs is substantially reduced. Tables 3 and 4 illustrate the source code of the example pair of chained shading programs after a first iteration of steps 307 through 331. FIGS. 5A and 5B illustrate these example chained shading programs in a data flow format.

TABLE 3

Example Fragment Shading Program After First Optimization Iteration

```
varying float varying1;
varying float varying2;
varying float varying3;
varying vec4 varying5;
uniform float derivedUniform1; // = uniform2 * uniform3 = 60.0
uniform float derivedUniform2; // = 0.5 * uniform3 = 15.0
void main( )
{
  float temp, temp2;
  if(varying1 < -9.1) {
    temp = varying2;
  } else {
    temp = derivedUniform1 * varying3;
  }
  temp2 = temp + derivedUniform2;
  gl_FragColor = temp2 * varying5;
}
```

TABLE 4

Example Vertex Shading Program After First Optimization Iteration

```
uniform float uniform8; // = 2.0
attribute float attrib1;
attribute vec4 attrib3;
uniform float derivedUniform3; // = uniform7 + uniform8 = 6.0
varying float varying1;
varying float varying2;
varying float varying3;
varying vec4 varying5;
void main( )
{
  varying1 = derivedUniform3;
  varying2 = uniform8;
  varying3 = attrib1;
  varying5 = attrib3;
  gl_Position = gl_ModelViewProjectionMatrix * gl_Vertex;
}
```

FIG. 5A illustrates data flow diagram 500, which corresponds to the optimized fragment shading program of Table 3. Comparing the data flow diagrams 400 and 500, it can be seen that after a first iteration of steps 307 through 331, the conditional branch 425 statement has been eliminated, due to its dependence on the value of uniform variable 407, which is constant for a batch of data. Additionally, uniform variables 411 and 413 can be replaced by derived uniform variable 505, which is equal to 432. In this example, the expression 434 including the uniform variable 409 is replaced by derived uniform value 507, which is equal to the value of expression 434. The use of the derived uniforms 505 and 507 saves the graphics processing subsystem from repeated redundant calculations of the value of expression 432 and 434. If the uniform variables 407, 409, 411, or 413 change value for another batch of data, then this example shading program must be re-optimized.

FIG. 5B illustrates data flow diagram 550, which corresponds to the optimized vertex shading program of Table 4. Comparing the data flow diagrams 450 and 550, it can be seen that after a first iteration of steps 307 through 331, output 461 is eliminated, as the example chained fragment shading program does not use this output. As a result, all of operations used to compute output 461 can be discarded. Moreover, as attribute 472 was only used to compute output 461, attribute 472 is also discarded; thus, attribute 472 will not even be fetched by the graphics processing subsystem during program execution, saving memory bandwidth. Additionally, uniform variables 480 and 482 in the unoptimized shading program are replaced by the derived uniform variable 555, which is equal to the value of the expression 485 in data flow diagram 450.

Comparing the optimized shading programs of FIGS. 5A and 5B with their unoptimized versions in FIGS. 4A and 4B, it can be seen that the first iteration of steps 307 to 331 greatly simplify the chained shading programs. As discussed above, step 331 determines whether any of the outputs of the upstream shading program are constants or uniform values that have not been previously considered. In this example, the first optimization iteration of the vertex shading program of FIG. 5B determines that outputs 455 and 457 are both uniform values, which are constant for a given batch of data. Varying output variable "varying1," 455 is equal to the derived uniform value 555. Similarly, output variable "varying2," 457 is equal to uniform value 560. Thus, steps 307 through 331 can be repeated to further optimize the chained pair of shading programs, using fragment shading program inputs 415 and 417, which correspond with vertex shading program outputs 455 and 457, as constants.

Figure 6A:
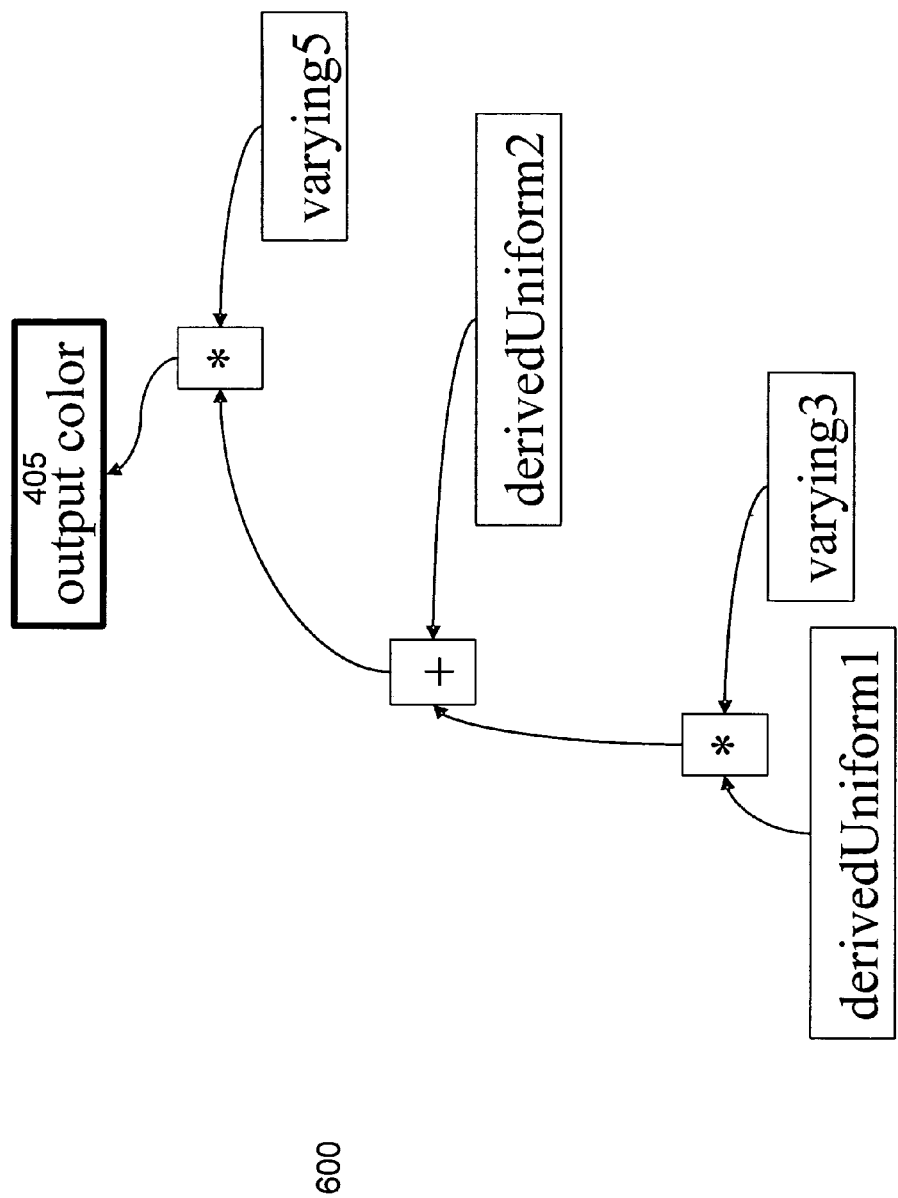
FIGS. 6A and 6B illustrate an example pair of chained shading programs after a second iteration of an optimization method according to an embodiment of the invention.
Figure 6B:
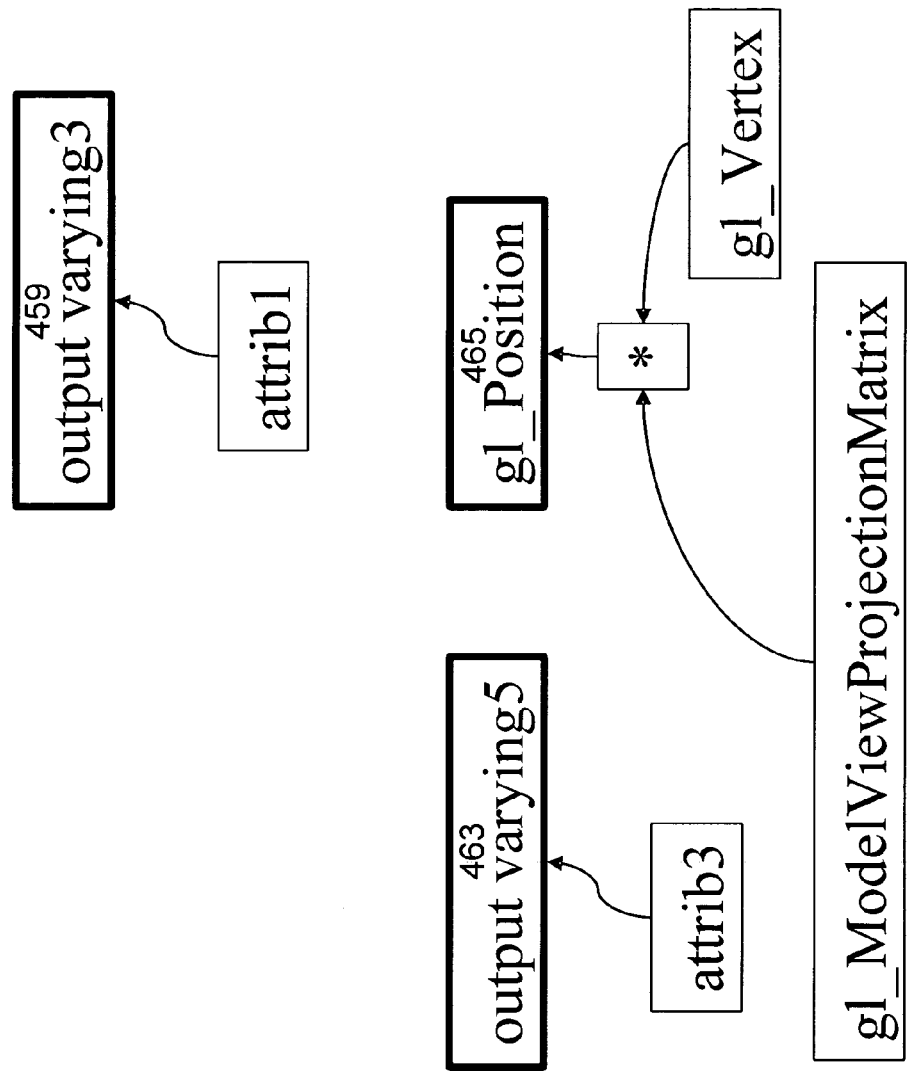

Tables 5 and 6 illustrates the source code of the example pair of chained shading programs after a second iteration of steps 307 through 331. Similarly, FIGS. 6A and 6B illustrate this example pair of chained shading programs after the second iteration of optimization in a data flow format.

TABLE 5

Example Fragment Shading Program After Second Optimization Iteration

```
uniform float derivedUniform1; // = uniform2 * uniform3 = 60.0
uniform float derivedUniform2; // = 0.5 * uniform3 = 15.0
varying float varying3;
varying vec4 varying5;
void main( )
{
  float temp, temp2;
  temp = derivedUniform1 * varying3;
  temp2 = temp + derivedUniform2;
  gl_FragColor = temp2 * varying5;
}
```

TABLE 6

Example Vertex Shading Program After Second Optimization Iteration

```
attribute float attrib1;
attribute vec4 attrib3;
varying float varying3;
varying vec4 varying5;
void main( )
{
  varying3 = attrib1;
  varying5 = attrib3;
  gl_Position = gl_ModelViewProjectionMatrix * gl_Vertex;
}
```

The data flow diagram 600 of FIG. 6A is the optimized version of the fragment shading program shown in diagram 400 of FIG. 4A. Comparing these two diagrams, it can be seen that conditional branch 427 has now been eliminated. This is a result of evaluating the conditional branch 427 with the varying input variables 415 and 417 treated as constants, which was determined in the previous iteration of optimization of the example vertex shading program. Additionally, all of the original uniform values in the fragment shading program have been replaced with derived uniform values, thereby eliminating redundant calculations.

The data flow diagram 650 of FIG. 6B shows the result of a second optimization iteration. Comparing this diagram with corresponding unoptimized diagram 450, it can be seen that varying output variables 455 and 457 have been eliminated. As both of these output variables output uniform values to the chained downstream shading program, these values can be eliminated in the upstream vertex shading program and replaced by constants in the chained downstream shading program.

In this example, following the second iteration of steps 307 through 331, there are no new constant or uniform outputs located in the upstream shading program. Therefore, after step 331, method 300 continues to step 333 for further optimizations and code generation. Further optimizations can include substituting a single efficient instruction in place of several instructions. For example, a multiply instruction followed by an add instruction can be replaced with a single multiply and accumulate instruction. Additional optimizations may be performed to take advantage of the pipelined hardware of the graphics processing subsystem. For example, instructions can be interleaved for better scheduling. Tables 7 and 8 illustrate the example pair of chained shading programs following step 339.

TABLE 7

Example Fragment Shading Program After Additional Optimizations

```
MAD R0.x, v.x, f[TEX0], v.y;
MUL o[COLR], R0.x, f[TEX1];
```

TABLE 8

Example Vertex Shading Program After Additional Optimizations

```
DP4 o[HPOS].w, c[0], v[0];
MOV o[TEX1], v[2];
DP4 o[HPOS].z, c[1], v[0];
MOV o[TEX0], v[1];
DP4 o[HPOS].y, c[2], v[0];
DP4 o[HPOS].x, c[3], v[0];
```

The fragment shading program of Table 7 corresponds with the unoptimized example fragment shading program of Table 1. Comparing the program code in these two tables, it can be seen that method 300 reduces the fragment shading program from a dozen or so of lines of high level shading language code to only two assembly language instructions. Similarly, the example vertex shading program in Table 2 is optimized from approximately ten instructions in its original form to only six instructions in Table 8.

Figure 7:
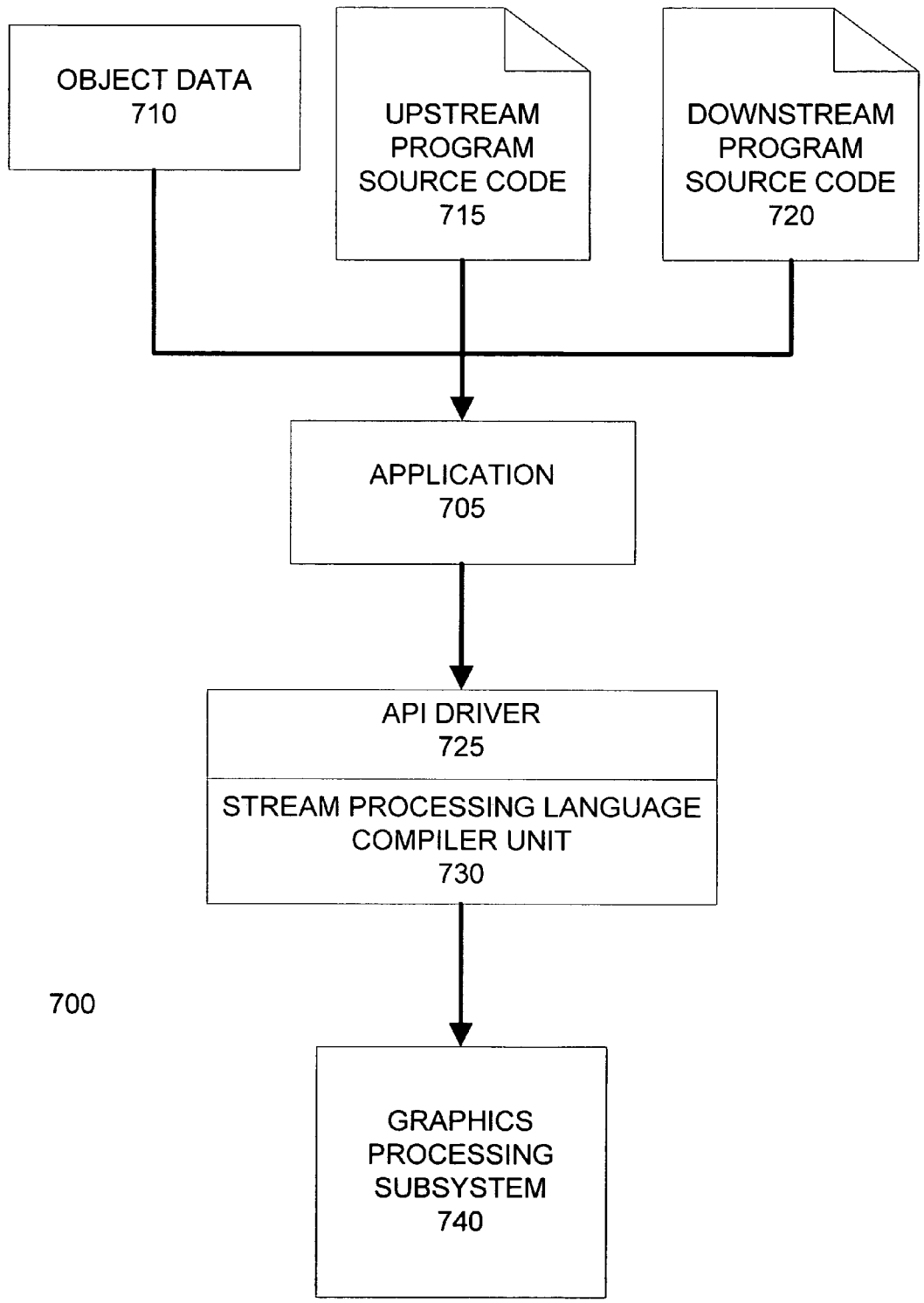
FIG. 7 illustrates a shading language architecture suitable for implementing an embodiment of the invention.

FIG. 7 illustrates a shading language architecture 700 suitable for implementing an embodiment of the invention. Shading language architecture includes an application 705. In an embodiment, the application 705 is adapted to command the graphics processing subsystem 740 to render one or more three-dimensional objects. Application 705 loads object data 710 that defines the objects to be rendered, including data for geometry, lighting, and texturing. Application 705 also loads source code fro the upstream 715 and downstream 720 shading programs. In an embodiment, the upstream 715 and downstream 720 shading programs can be vertex and fragment shading programs, respectively.

To render objects using the upstream 715 and downstream 720 shading programs, the application 705 sends the shading programs to the API driver 725. Additionally, application 705 sends commands to the API driver 725 directing the API driver to chain the upstream 715 and downstream 720 shading programs together, and to compile and optimize the chained shading programs. The stream processing language compiler 730, which in an embodiment is a part of the API driver 725, performs the compilation and optimization of shading programs. In an alternate embodiment, the stream processing language compiler 730 is an external module or library dynamically linked with the API driver 725 or the application 705.

The application 705 then sends the object data 710 to the API driver 725 along with commands indicating that the object data 710 should be rendered. As a result, the API driver 725 sends the object data 710, and compiled and optimized versions of the chained shading programs 715 and 720 to the graphics processing subsystem 740. The graphics processing subsystem 740 executes the chained shading programs to process the object data 710 and render the objects.

This invention provides a system for optimizing stream processing programs based on the relationships between the stream processing programs. Although this invention has been discussed with reference to stream processing systems used in computer graphics applications, the invention is applicable to any stream processing system having two or more programmable stream processing units, including audio applications and communications applications. The invention has been discussed with respect to specific examples and embodiments thereof; however, these are merely illustrative, and not restrictive, of the invention. Thus, the scope of the invention is to be determined solely by the claims.

What is claimed is:

1. A method for optimizing stream processing programs adapted to be executed by a stream processing system, wherein the stream processing system includes a first and a second programmable stream processing units, wherein the second stream processing unit is connected with the first stream processing unit such that the output of the first stream processing unit is adapted to be the input of the second stream processing unit, the method comprising:

receiving a first stream processing program adapted to be executed by a first stream processing unit, wherein the first stream processing program includes an output parameter;

receiving a second stream processing program adapted to be executed by a second stream processing unit, wherein the second stream processing program includes an input parameter corresponding to the output parameter of the first stream processing program; and optimizing the first and second stream processing programs based upon the correspondence between the input parameter of the second stream processing program and the output parameter of the first stream processing program.

2. The method of claim 1, wherein optimizing the first and second stream processing programs includes eliminating from the first stream processing program dead program code adapted to compute an additional output parameter that is not used by the second stream processing program.

3. The method of claim 1, wherein optimizing the first and second stream processing programs includes:

propagating a constant value for the input parameter of the second stream processing program in response to a determination that the output parameter of the first stream processing program is a constant; and eliminating from the second stream processing program dead program code made redundant as a result of propagating a constant value.

4. The method of claim 1, wherein optimizing the first and second stream processing programs includes:

propagating a uniform value for the input parameter of the second stream processing program in response to a determination that the output parameter of the first stream processing program is a uniform value; and eliminating from the second stream processing program dead program code made redundant as a result of propagating a uniform value.

5. The method of claim 1, wherein the stream processing system resides within a graphics processing subsystem.

6. The method of claim 5, wherein the first programmable stream processing unit is a programmable vertex processor.

7. The method of claim 5, wherein the second programmable stream processing unit is a programmable vertex processor.

8. The method of claim 5, wherein the first programmable stream processing unit is a programmable tessellation processor.

9. The method of claim 5, wherein the second programmable stream processing unit is a programmable fragment processor.

10. The method of claim 1, wherein at least one of the stream processing programs is written in OpenGL Shading Language.

11. The method of claim 1, wherein at least one of the stream processing programs in written in Cg language.

12. The method of claim 1, wherein at least one of the stream processing programs in written in DirectX High Level Shading Language.

13. The method of claim 1, wherein optimizing the first and second stream processing programs includes a plurality of iterations of alternately optimizing the second stream processing program and the first stream processing program until both the first and second stream processing programs are optimized based upon the correspondence between the input parameter of the second stream processing program and the output parameter of the first stream processing program.

14. The method of claim 1, further comprising compiling the optimized first and second stream processing program to formats adapted to be executed by the stream processing system.

15. An information storage medium including a set of processor instructions adapted to direct an information processing device to perform a set of steps, wherein the information processing device includes a stream processing system including a first and a second programmable stream processing units, wherein the second stream processing unit is connected with the first stream processing unit such that the output of the first stream processing unit is adapted to be the input of the second stream processing unit, wherein the set of steps comprise:

receiving a first stream processing program adapted to be executed by a first stream processing unit, wherein the first stream processing program includes an output parameter;

receiving a second stream processing program adapted to be executed by a second stream processing unit, wherein the second stream processing program includes an input parameter corresponding to the output parameter of the first stream processing program; and optimizing the first and second stream processing programs based upon the correspondence between the input parameter of the second stream processing program and the output parameter of the first stream processing program;

wherein optimizing the first and second stream processing programs includes a plurality of iterations of alternately optimizing the second stream processing program and the first stream processing program until both the first and second stream processing programs are optimized based upon the correspondence between the input parameter of the second stream processing program and the output parameter of the first stream processing program.

16. The information storage medium of claim 15, wherein optimizing the first and second stream processing programs includes eliminating from the first stream processing program dead program code adapted to compute an additional output parameter that is not used by the second stream processing program.

17. The information storage medium of claim 15, wherein optimizing the first and second stream processing programs includes:

propagating a constant value for the input parameter of the second stream processing program in response to a determination that the output parameter of the first stream processing program is a constant; and eliminating from the second stream processing program dead program code made redundant as a result of propagating a constant value.

18. The information storage medium of claim 15, wherein optimizing the first and second stream processing programs includes:

propagating a uniform value for the input parameter of the second stream processing program in response to a determination that the output parameter of the first stream processing program is a uniform value; and eliminating from the second stream processing program dead program code made redundant as a result of propagating a uniform value.

19. The information storage medium of claim 15, wherein one of the programmable stream processing units is a programmable vertex processor.

20. The information storage medium of claim 15, wherein at least one of the stream processing programs is written in OpenGL Shading Language.

21. A system adapted to render an image, the system comprising:

a graphics processing subsystem including a first and a second programmable stream processing units, wherein the second stream processing unit is connected with the first stream processing unit such that the output of the first stream processing unit is adapted to be the input of the second stream processing unit;

an API driver adapted to receive a set of rendering commands and data from a rendering application, wherein the set of rendering commands and data including a first stream processing program and a second stream processing program, and to dispatch the first and second stream processing programs to a stream processing language compiler unit;

wherein the stream processing language compiler unit is adapted to:

receive the first stream processing program adapted to be executed by the first stream processing unit, wherein the first stream processing program includes an output parameter;

receive the second stream processing program adapted to be executed by the second stream processing unit, wherein the second stream processing program includes an input parameter corresponding to the output parameter of the first stream processing program; and optimizing the first and second stream processing programs based upon the correspondence between the input parameter of the second stream processing program and the output parameter of the first stream processing program;

wherein optimizing the first and second stream processing programs includes a plurality of iterations of alternately optimizing the second stream processing program and the first stream processing program until both the first and second stream processing programs are optimized based upon the correspondence between the input parameter of the second stream processing program and the output parameter of the first stream processing program.

22. The system of claim 21, wherein the API driver is further adapted to receive the optimized first and second stream processing programs from the stream processing language compiler unit, to communicate the set of rendering commands and data and the optimized first and second stream processing programs with the graphics processing subsystem, and to instruct the graphics processing subsystem to process at least a portion of the set of rendering commands and data by executing the optimized first and second stream processing programs with the first and second stream processing units, respectively.

23. The system of claim 21, wherein the stream processing language compiler unit is further adapted to compile the optimized first and second stream processing program to formats adapted to be executed by the stream processing system.

24. The system of claim 21, wherein the graphics processing subsystem includes a graphics processing unit.

25. The system of claim 21, wherein the graphics processing subsystem includes a graphics memory adapted to store at least a portion of the set of rendering commands and data.

* * * * *